W. BOYNTON, Jr.
Churn.
No. 34,936.
Patented April 15, 1862.
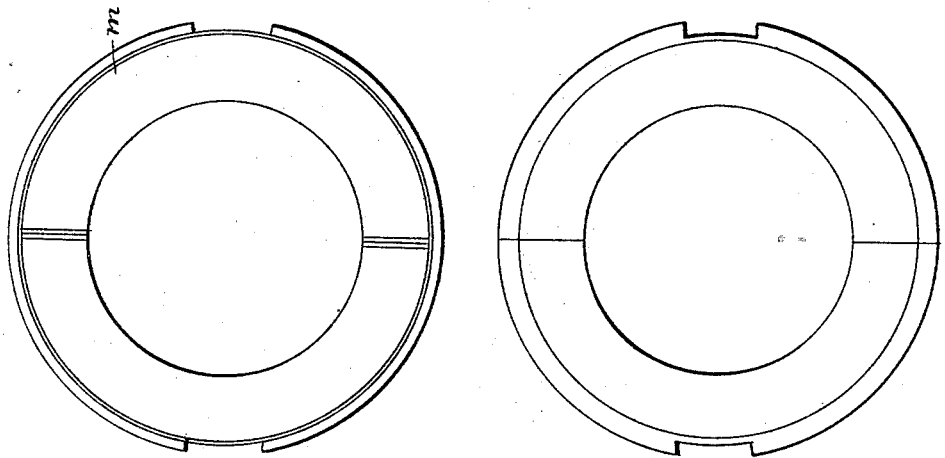
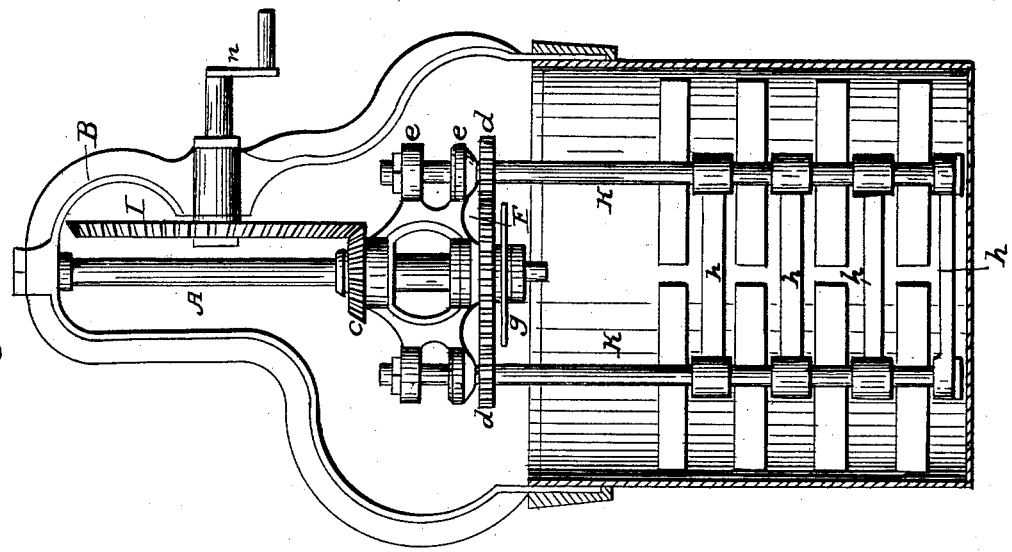
Witnesses:
E. M. Alexander
Charles Alexander
Inventor:
Wm Boynton
p. atty J. H. Alexander

UNITED STATES PATENT OFFICE.

WILLIAM BOYNTON, JR., OF AUBURN, NEW YORK.

IMPROVEMENT IN CHURNS.

Specification forming part of Letters Patent No. 34,936, dated April 15, 1862.

*To all whom it may concern:*

Be it known that I, WILLIAM BOYNTON, Jr., of the town of Auburn and State of New York, have invented certain new and useful Improvements in Churns; and I hereby declare that the following is a true and exact description of the same, reference being had to the accompanying drawings, and to the letters of reference marked thereon.

The annexed drawings, which make a part of this specification, represent a vertical section of my churn.

The letter A in Figure 1 is the main shaft, fastened permanently at top to the frame B, which fits with dovetails into corresponding openings near the top of the churn, and is easily removed when necessary for cleansing the churn. C is a bevel-wheel on the shaft A and plays loosely around it. Immediately beneath this wheel and firmly attached to it are the double arms $e\,e$, the enlarged ends of which are penetrated by the two shafts $k\,k$, the holes in the arms being sufficiently large to admit of the shafts playing freely in them. The shafts $k\,k$ receive their motion from the pinions $d\,d$, which play around the stationary spur-wheel F, beneath which is the disk $g$, intended to prevent the milk or cream from splashing upward and interfering with the action of the wheels. The shafts $k\,k$ are penetrated by slats placed at such a distance apart as to admit the cross-bars $h\,h\,h\,h$ passing between them in their respective revolutions. By this arrangement I have three series of dashers all operating at the same time, and thus facilitating the process of separating the butter from the milk or cream.

Fig. 2 represents an inside plan view of the adjustable top, and the letter $m$ the flange, which fits into the top of the churn and keeps it in position. The top is formed of two segments and a circle cut out at the center sufficiently large to admit of a free play of the wheels. L is the main driving-wheel, the shaft of which passes through the frame B. $n$ is the crank by which the machine is operated.

Having thus accurately described my invention, what I claim, and desire to secure by Letters Patent, is—

The stationary shaft A, in combination with the double arms $e\,e$, the revolving shafts $k\,k$, and the cross-bars $h\,h\,h\,h$, operated as herein fully set forth and described.

WILLIAM BOYNTON, JR.

Witnesses:
 HORACE T. COOK,
 E. H. WILCOX.